(12) United States Patent
Kawabata

(10) Patent No.: US 9,715,396 B2
(45) Date of Patent: Jul. 25, 2017

(54) TERMINAL DEVICE, ANNOTATION METHOD, COMPUTER SYSTEM, AND COMPUTER PROGRAM

(71) Applicant: NIPPON TELEGRAPH AND TELEPHONE CORPORATION, Tokyo (JP)

(72) Inventor: Yuto Kawabata, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 311 days.

(21) Appl. No.: 14/399,245

(22) PCT Filed: Jun. 17, 2013

(86) PCT No.: PCT/JP2013/066581
§ 371 (c)(1),
(2) Date: Nov. 6, 2014

(87) PCT Pub. No.: WO2014/002812
PCT Pub. Date: Jan. 3, 2014

(65) Prior Publication Data
US 2015/0149900 A1 May 28, 2015

(30) Foreign Application Priority Data
Jun. 29, 2012 (JP) ................................ 2012-146383

(51) Int. Cl.
*G06F 3/048* (2013.01)
*G06F 9/44* (2006.01)
(Continued)

(52) U.S. Cl.
CPC .......... *G06F 9/4446* (2013.01); *G06F 3/0481* (2013.01); *G06F 17/241* (2013.01)

(58) Field of Classification Search
CPC .......... G06F 9/4446; G06F 17/24; G06F 17/28
See application file for complete search history.

(56) References Cited

U.S. PATENT DOCUMENTS

| | | | |
|---|---|---|---|
| 2002/0087556 A1* | 7/2002 | Hansmann | G06F 17/30578 |
| 2007/0113180 A1* | 5/2007 | Danninger | G06F 3/0481 715/705 |

(Continued)

FOREIGN PATENT DOCUMENTS

| | | |
|---|---|---|
| JP | 2006-4298 A | 1/2006 |
| JP | 2009-37362 A | 2/2009 |
| JP | 2010-66868 A | 3/2010 |

OTHER PUBLICATIONS

Japanese Office Action dated Jul. 5, 2016 from corresponding Japanese Application No. JP 2015-156649, 6 pages.

(Continued)

*Primary Examiner* — Claudia Dragoescu
(74) *Attorney, Agent, or Firm* — Ohlandt, Greeley, Ruggiero & Perle, L.L.P.

(57) ABSTRACT

A terminal device, which can reduce a calculation amount for displaying an annotation text, an annotation method, a computer system, and a computer program.
A plurality of annotation rules created for each window in which an annotation text is to be displayed are accumulated in an annotation DB, which of windows displayed on an operation screen is an active window is always monitored by a business screen state acquisition section, and when annotation display operation is performed by a user, an annotation display section obtains an annotation rule of an active window associated with the user's operation from the annotation DB and displays an annotation text included in the annotation rule on the operation screen.

18 Claims, 10 Drawing Sheets

(51) Int. Cl.
 G06F 3/0481 (2013.01)
 G06F 17/24 (2006.01)

(56) References Cited

U.S. PATENT DOCUMENTS

2011/0289401 A1* 11/2011 Fischer ................. G06F 17/211
 715/232
2012/0243745 A1* 9/2012 Amintafreshi ...... G06F 11/3692
 382/103

OTHER PUBLICATIONS

International Preliminary Report on Patentability dated Jan. 8, 2015 corresponding to International Patent Application No. PCT/JP2013/066581; 6 pages.
Yeh, et al.; "Sikuli: Using GUI Screenshots for Search and Automation" Oct. 2009; 10 pages.
Yeh, et al.; "Creating Contextual Help for GUIs Using Screenshots"; Oct. 2011; 10 pages.
International Search Report dated Jul. 9, 2013 corresponding to International Patent Application No. PCT/JP2013/066581; 3 pages.

* cited by examiner

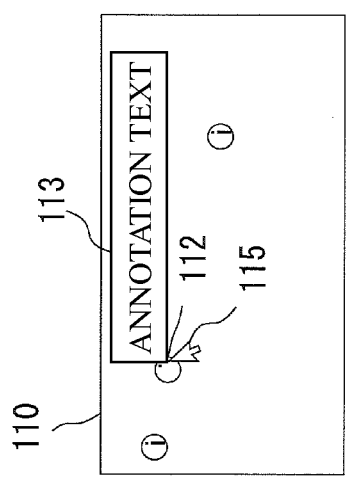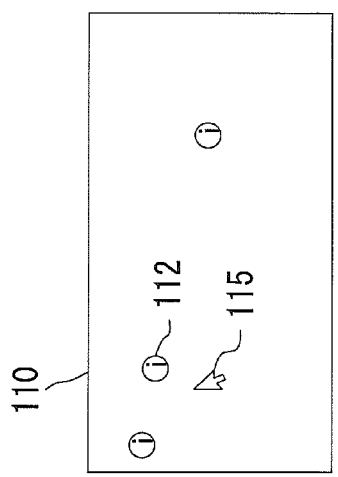
Fig.4

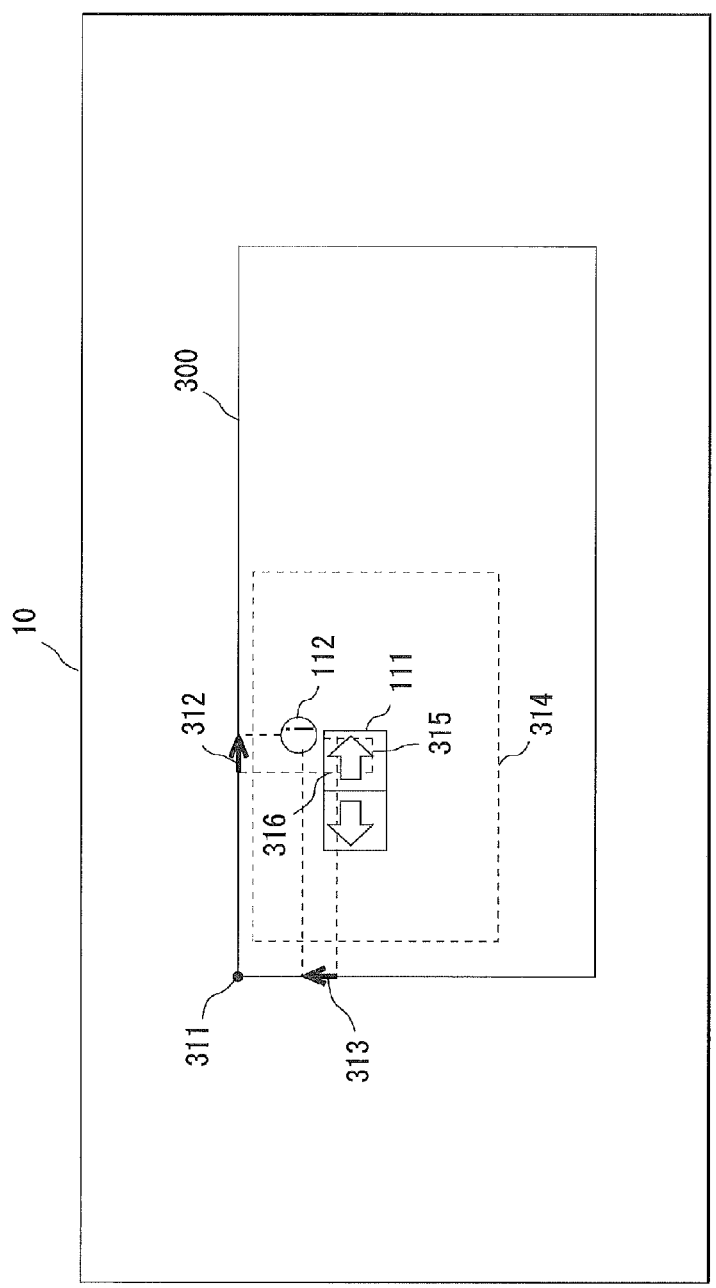

Fig.6

```
<script>
    <window class="SciCalc" id=" " process_name="calc.exe" size=" " title="CALCULATOR">
        <img name="base1.bmp">
            <timestamp value=" "/>
            <annotate id=" " message="NEW MESSAGE 1">
                <img name=" "/>
                <targetrange>
                <searchrange>
                <position>
                <similarity>
            </annotate>
            <annotate id=" " message="NEW MESSAGE 2" >
                <img name=" "/>
                <targetrange>
                <searchrange>
                <position>
                <similarity>
            </annotate>
        </img>
        <img name="base2.bmp">
            <timestamp value=" "/>
            <annotate id=" " message="NEW MESSAGE 1">
                <img name=" "/>
                <targetrange>
                <searchrange>
                <position>
                <similarity>
            </annotate>
        </img>
    </window>
</script>
```

Fig.7

```
<script>
  <user class="user A" authority="groupA">
    <window class="SciCalc" id="WINDOW_20120210_111341" process_name="calc.exe" size="559,297" title="CALCULATOR">
      <img name="base1.bmp">
        <timestamp value=" "/>
        <annotate id=" " message="NEW MESSAGE 1">
          <img name=" "/>
          <targetrange>
          <searchrange>
          <position>
          <similarity>
        </annotate>
        <annotate id=" " message="NEW MESSAGE 2" >
          <img name=" "/>
          <targetrange>
          <searchrange>
          <position>
          <similarity>
        </annotate>
      </img>
      <img name="base2.bmp">
        <timestamp value=" "/>
        <annotate id=" " message="NEW MESSAGE 1">
          <img name=" "/>
          <targetrange>
          <searchrange>
          <position>
          <similarity>
        </annotate>
      </img>
    </window>
  </user>
  <user class="user_B" authority="groupB">
    <window class></window>
  </user>
</script>
```

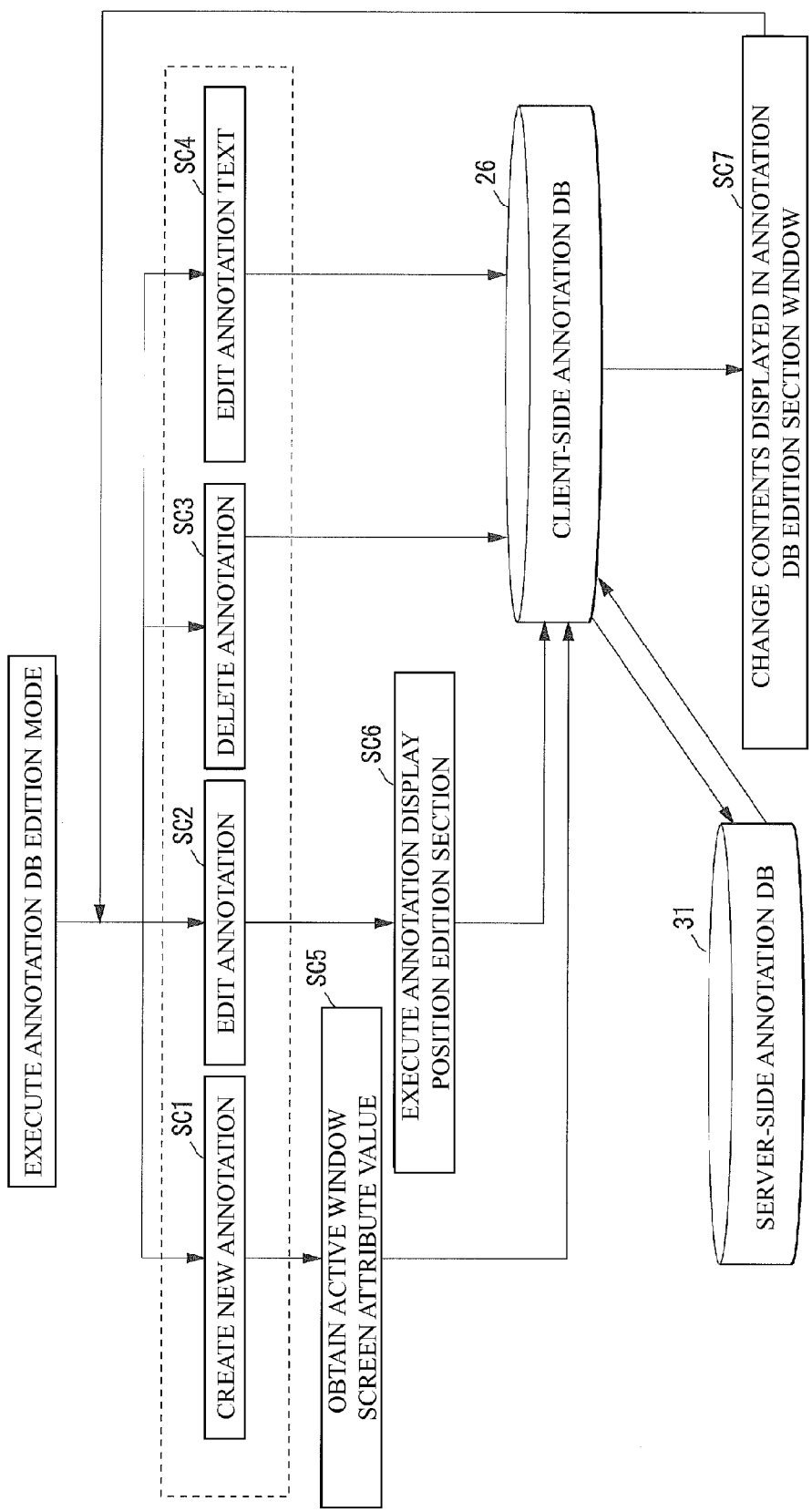

TERMINAL DEVICE, ANNOTATION METHOD, COMPUTER SYSTEM, AND COMPUTER PROGRAM

BACKGROUND

1. Field of the Disclosure

The present disclosure relates to a business system operated by a terminal device, the business system is a system which operates on the terminal device while serving as an agent designed to directly support a user conducting business, and the disclosure relates particularly to a technique that can additionally-write or share business knowledge with respect to a user interface on an operation screen at the initiative of various users without modifying an existing business system.

2. Discussion of the Background Art

Basically, a user who conducts business while operating a terminal device cannot directly describe business knowledge with respect to a user interface in an actual business system to be operated because it is accompanied by modification of the business system. Even if there is an API (Application Program Interface) of the business system to be operated, in order to describe the business knowledge, while implementation of the API provided by various business systems is required to be grasped in each case, individual adapters designed to access from a function adapted to an architecture of the business system are required to be set, and therefore, it is not versatile.

Thus, when a user describes business knowledge of a business system, the business knowledge is often accumulated by using a knowledge sharing tool such as text and a wiki separately from the business system. However, it is difficult for the user to describe, in a text described in such a knowledge sharing tool, that at what timing the user should refer to the business knowledge with respect to a change of a window of a screen, and since the business knowledge is converted into primary information called text, it is difficult to provide the business knowledge in a form linked to an actual operation on a 2D screen.

Further, it is difficult to provide business knowledge directly to a user based on a widget displayed on a screen (a unique control such as a button and text displayed on the screen).

Further, when a certain user imparts new business knowledge to business knowledge in text format described by another user, the user should understand the context and background of the business knowledge accumulated by another user, and since the business knowledge is not described in format synchronized with a user interface displayed on the screen, a troublesome work is required when knowledge based on an actual operation screen is documented, and it is difficult to express the knowledge.

Furthermore, since there is not provided an environment in which a creator of a system managing a business system and a person on a main control side refer to a manual for operating the business system and receive feedback directly from a user during actual operation, there is no opportunity to improve a manual, and further, there is such a background that there are not provided a database (hereinafter referred to as DB) designed to share business knowledge between operators on the field through an operation screen and an operation support tool operated by a terminal device for sharing business knowledge without regard to the environment of a terminal device and architecture of a business system.

Meanwhile, there has been known Sikuli as a tool which, when a business system does not have an API for access from outside, can give text for explaining the fact to automatic operation and a widget on a screen without modifying an existing business system operated on a terminal device (see, Non Patent Literature 1).

Sikuli uses template matching of an image based on OpenCV, and it is advantageous in that an end user embeds an image on an operation screen directly into a script of Python, whereby an operation support script can be easily written compared with a conventional operation support tool. In Sikuli, text corresponding to the result of template matching of an image can be described in an automated script, and a function of overlay-displaying text by image matching is added to an actually operating system (see, Non Patent Literature 2).

CITATION LIST

Non-Patent Literature

Non Patent Literature 1: "Sikuli: using GUI screenshots for search and automation" (UIST '09 proceeding)

Non Patent Literature 2: "Creating contextual help for GUIs using screenshots" (UIST '11 proceeding)

However, in the techniques disclosed in Non Patent Literatures 1 and 2, since template matching of an image is greedily applied to an image on the entire screen displayed on an operation screen by default, there is a problem that a calculation amount is increased.

Further, there is a problem that an event in an operation screen on which text desired by a user is to be displayed is required to be previously determined by a user himself/herself and converted into a script. Furthermore, there are problems including a problem that since an event itself as a trigger to display a text is caused by template matching of an image, image matching is performed regardless of a window being active or inactive, and therefore, a pattern failing in image matching is assumed from a change of a display on a screen in the inactive state and required to be clearly converted into a script, a problem that since image matching itself is caused by an event when text is given in cooperation with operation of an actual business system, a calculation amount according to constant monitoring is increased, a problem that since a trigger of image matching for monitoring is left to user's own determination, a user cannot acquire the timing for displaying business knowledge well, a problem that there is no user interface designed for a user to select a text that the user wants to see from some candidates of text while the user watches a screen of an actual business system, a problem that when a script including text desired to be displayed is managed, a portion to be searched is present in any one of windows displayed on a screen, and there is no specific DB; therefore, an environment in which a user edits collectively arranged text display portions and images is not provided, and a problem that since a DB for editing designed to share a script between users is not provided, it is difficult for another user to edit and additionally-write the script.

SUMMARY

In view of the above problems, an object of the present disclosure is to provide a terminal device, which can reduce a calculation amount in order to display a text and an icon (annotation) displayed on a screen following user's operation, an annotation method, a computer system, and a computer program.

Another object of the present disclosure is to provide a terminal device, which allows an arbitrary user to easily add and edit an annotation text, an annotation method, a computer system, and a computer program.

Solution to Problem

In order to achieve the above object, according to the present disclosure, there is provided a terminal device including:

an annotation database which accumulates a plurality of annotation rules created for each window in which an annotation text is to be displayed;

a business screen state acquisition section which always monitors which of windows displayed on an operation screen on which a plurality of windows can be displayed is an active window and requests, when through searching of the annotation database an annotation rule corresponding to the active window exists in the annotation database and annotation display operation is performed by the user, an annotation display section to display an annotation text; and the annotation display section which obtains an annotation rule associated with user's operation from the annotation database in response to the request from the business screen state acquisition section and displays an annotation text included in the annotation rule on the operation screen.

According to the terminal device of the present disclosure, in the annotation database, the annotation rule is accumulated separately for each window to be displayed, and which of the active windows in which an annotation is to be displayed is always monitored; therefore, when the annotation text is displayed, only the annotation text included in the annotation rule accumulated corresponding to the active window is searched and displayed.

In order to achieve the above object, according to the present disclosure, the terminal device further includes:

an active window screen attribute value acquisition section which registers, when a window to which an annotation is to be given is designated, an attribute value of the window screen as the annotation rule in the annotation database;

an annotation display position edition section which, based on user's operation, designates a position where the annotation text is displayed and a search region of a template image with reference to a predetermined collation position and designates the template image from an annotation base image as a capture image of the entire active window; and an annotation database edition section which, based on user's operation, edits a template image of an active window as an annotation rule accumulated in the annotation database and edits an attribute value of an active window screen, wherein the business screen state acquisition section detects the active window on the operation screen and indicates the coordinate position and size of the active window to the annotation display section so that an annotation icon, a message tooltip, and an annotation text are displayed only in the detected active window, and when a user refers to an annotation, the annotation display section displays an annotation icon, a message tooltip, and an annotation text registered in the annotation database at a predetermined position near an image corresponding to a template image which is located in the active window instructed by the business screen state acquisition section and is designated by a user.

According to the terminal device of the present disclosure, when a window to which an annotation is to be given is designated, an attribute value of a screen of the window is registered as the annotation rule in the annotation database by the active window screen attribute value acquisition section, and based on user's operation, the annotation display position edition section designates a position where an annotation text is displayed and a search region of the template image with reference to a predetermined collation position and designates a template image from an annotation base image which is a capture image of the entire active window. The annotation database edition section edits the template image of an active window as the annotation rule accumulated in the annotation database based on user's operation and edits the attribute value of the active window screen, a business screen state acquisition section detects the active window on an operation screen and indicates the coordinate position and size of the active window to the annotation display section so that an annotation icon, a message tooltip, and an annotation text are displayed only in the detected active window. When a user refers to an annotation, the annotation display section displays an annotation icon, a message tooltip, and an annotation text registered in the annotation database at a predetermined position near an image corresponding to a template image which is located in the active window instructed by the business screen state acquisition section and is designated by a user.

In order to achieve the above object, according to the present disclosure, in the terminal device, the business screen state acquisition section always monitors user's operation in a polling format to obtain a window size and a window coordinate position, calculates a difference between the window coordinate position and a coordinate position where an annotation is to be displayed, and performs redrawing of the annotation based on the calculation result.

According to the terminal device of the present disclosure, the business screen state acquisition section always monitors user's operation in a polling format and obtains a window size and a window coordinate position, a difference between the window coordinate position and a coordinate position where an annotation is to be displayed is calculated, and the annotation is redrawn based on the calculation result.

In order to achieve the above object, according to the present disclosure, there is provided an annotation method including:

a data accumulating step of accumulating a plurality of annotation rules created for each window in which an annotation text is to be displayed in an annotation database formed in a rewritable storage section;

a monitor step of, after the data accumulating step, always monitoring which of windows displayed on an operation screen on which a plurality of windows can be displayed is an active window; and a display step of obtaining, when through searching of the annotation database an annotation rule corresponding to the active window exists in the annotation database and annotation display operation is performed by a user, an annotation rule associated with the user's operation from the annotation database and displaying an annotation text included in the annotation rule on the operation screen, wherein the monitor step and the display step are executed in parallel.

According to the annotation method of the present disclosure, the terminal device accumulates a plurality of annotation rules, created for each window in which an annotation text is to be displayed, in the annotation database, and an active window displayed on an operation screen is always monitored; therefore, the annotation database is searched by property information of the window, when an annotation rule corresponding to the active window exists in the annotation database and, at the same time, annotation display operation is performed by a user, the annotation rule associated with the user's operation is obtained from the annotation database, and the annotation text is displayed on the operation screen.

In order to achieve the above object, according to the present disclosure, in the annotation method, the terminal device executes, in the data accumulating step, an attribute value acquisition step of registering, when a window to which an annotation is to be given is designated, an attribute value of the window screen as the annotation rule in the annotation database, in the data accumulating step, a display position editing step of, based on user's operation, designating a display position of an annotation text and a search region of a template image with reference to a predetermined collation position and designating the template image from an annotation base image as a capture image of the entire active window, or in the data accumulating step, a database editing step of editing a template image of an active window as an annotation rule accumulated in the annotation database based on user's operation and editing an attribute value of an active window screen, and in the display step, a tool display step of displaying, when a user refers to the annotation, an annotation icon, a message tooltip, and an annotation text registered in the annotation database at a predetermined position near an image corresponding to a template image which is located in the active window and designated by a user.

According to the annotation method of the present disclosure, when the terminal device designates a window in which an annotation is to be given, an attribute value of a screen of the window is registered as an annotation rule in an annotation database, and based on user's operation, a position where an annotation text is displayed and a search region of a template image are designated with reference to a predetermined collation position, and the template image is designated from an annotation base image as a capture image of the entire active window. Further, based on user's operation, while a template image of an active window as the annotation rule accumulated in the annotation database is edited, the attribute value of the active window screen is edited, when a user refers to an annotation, an annotation icon, a message tooltip, and an annotation text registered in the annotation database are displayed at a predetermined position near an image corresponding to a template image located in the active window and designated by a user.

In order to achieve the above object, according to the present disclosure, in the annotation method, in the display step, the terminal device always monitors user's operation in a pooling format to obtain a window size and a window coordinate position, calculates a difference between the window coordinate position and a coordinate position where an annotation is to be displayed, and redraws an annotation text based on the calculation result.

According to the annotation method of the present disclosure, user's operation is always monitored in a polling format, a window size and a window coordinate position are obtained, a difference between the obtained window coordinate position and a coordinate position where an annotation is to be displayed is calculated, and an annotation text is redrawn based on the calculation result.

In order to achieve the above object, according to the present disclosure, there is provided a computer system including the terminal device as a client terminal, the client terminal being connected to a server through a communication network, wherein the server includes a server-side annotation database accumulating an annotation rule equivalent to an annotation rule accumulated in an annotation database of the client terminal, and the annotation database of the client terminal is synchronized with a change applied to an annotation rule accumulated in the annotation database itself and indicates a change the same as the change to the server-side annotation database.

According to the computer system of the present disclosure, a server-side annotation database accumulating annotation rules equivalent to annotation rules accumulated in an annotation database of a client terminal is changed in synchronism with a change applied to the annotation rules accumulated in the annotation database of the client terminal.

In order to achieve the above object, according to the present disclosure, there is provided a computer program for causing a terminal device including a computer apparatus to execute the annotation method.

According to the computer program of the present disclosure, the above annotation method is executed by a terminal device constituted of a computer device in which the program is started.

Advantageous Effects of Disclosure

According to the present disclosure, when an annotation text is displayed, an annotation rule having a title name equivalent to an active window in an annotation rule registered in an annotation database is searched, and only an extracted annotation rule may be processed; therefore, a calculation amount and time taken for displaying an annotation text can be reduced compared with the prior art.

Further, a user can register, in an annotation database, an annotation rule of a new window to which an annotation is to be given and at the same time can add and edit the annotation rule accumulated in the annotation database. Meanwhile, when the annotation text is displayed, a search region of template matching is previously limited in an active window, whereby efficient matching with a calculation amount for searching suppressed is achieved. Furthermore, when an annotation text is redrawn, a difference of a window coordinate position and a coordinate position where the annotation is to be displayed is calculated, and an annotation is redrawn based on the calculation result; therefore, a calculation amount and time taken for redrawing the annotation text can be reduced compared with the prior art. Since an annotation rule accumulated in a server-side annotation database is changed in synchronism with a change of an annotation rule accumulated in a client-side annotation database, the annotation rule can be shared with users using other client terminals.

BRIEF DESCRIPTION OF THE DRAWINGS

FIG. 4 is a view for explaining a structure of annotation display in the embodiment of the disclosure.

FIG. 5 is a view for explaining operation of an annotation display position edition section in the embodiment of the disclosure.

FIG. 6 is a view showing an example of a file structure of an annotation rule accumulated in a client-side annotation database in the embodiment of the disclosure.

FIG. 7 is a view showing an example of a file structure of an annotation rule accumulated in a server-side annotation database in the embodiment of the disclosure.

FIG. 10 is a flow chart for explaining an annotation edition mode in the embodiment of the disclosure.

DETAILED DESCRIPTION OF THE PREFERRED EMBODIMENT

Figure 1:
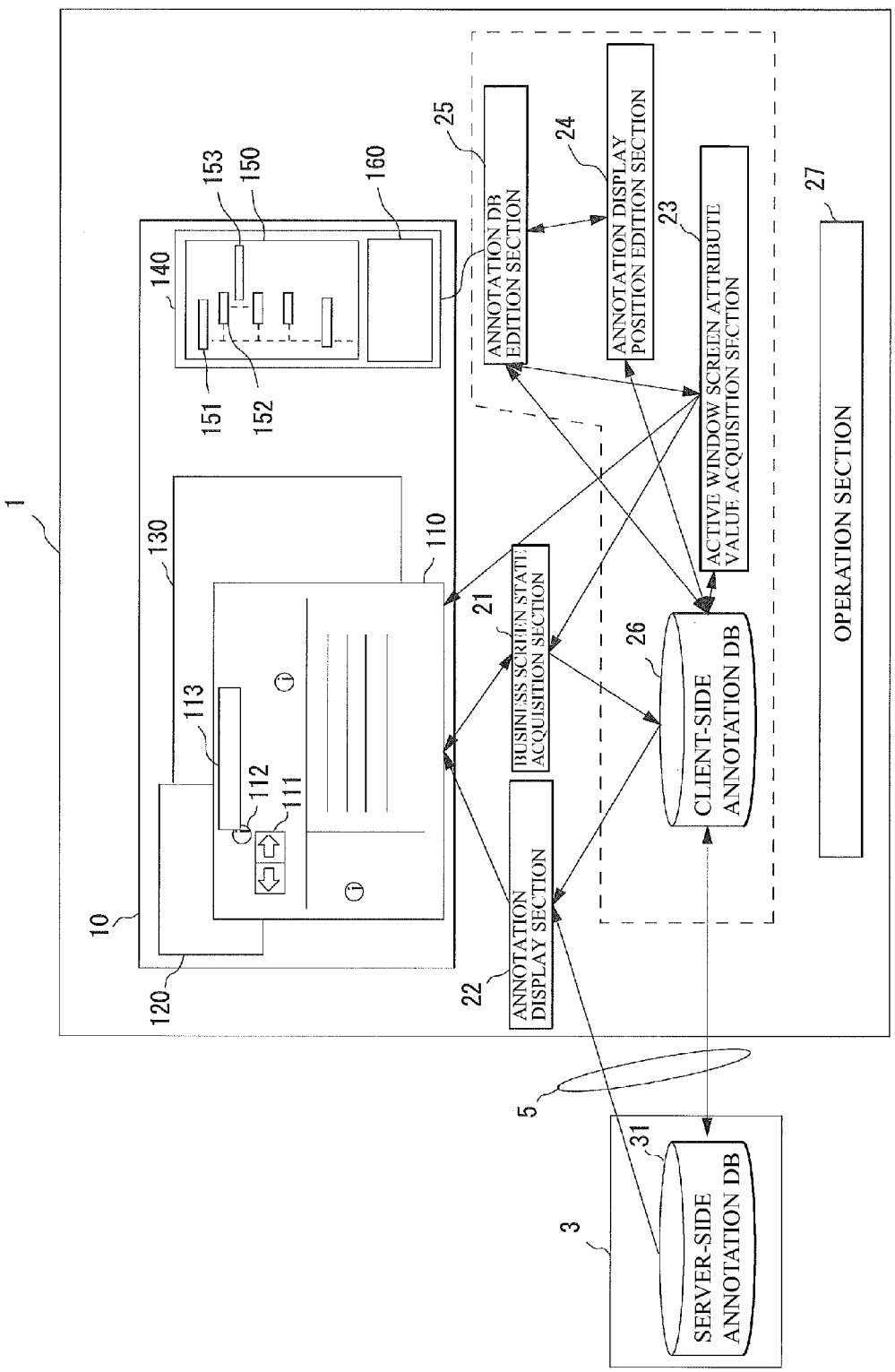
FIG. 1 is a block diagram showing a computer system in one embodiment of the present disclosure.

This embodiment will explain one specific example of a computer system and a terminal device according to the present disclosure, in which when various users utilizing an application of a business system of a client terminal (terminal device) conduct business through an operation screen, the users refer to an annotation database (hereinafter referred to as annotation DB) previously created based on an image displayed on an operation screen, and an annotation text is displayed in an active window to be operated so as to be overlaid on an operation screen.

Hereinafter, one embodiment of the present disclosure will be described with reference to the accompanying drawings. The embodiment to be described hereinafter is one example of the disclosure, and the disclosure is not limited to the following embodiment. Components denoted by the same reference numerals in the present specification and drawings mutually denote the same components.

FIG. 1 is a block diagram showing a configuration of a computer system in this embodiment. In FIG. 1, reference numeral 1 is a client terminal, and reference numeral 3 is a server. The client terminal 1 and the server 3 are connected through a network (communication network) 5 and are in a state capable of communicating with each other.

The annotation DB to be hereinafter described is a generic name of two DBs (databases) including a client-side annotation DB provided in the client terminal 1 and a server-side annotation DB provided in the server 3. The fact that a user refers to the annotation DB means that the user refers to the client-side annotation DB and that the user refers to the server-side annotation DB. A user can refer to the server-side annotation DB directly from the client terminal 1 through the network 5. Between the client-side annotation DB and the server-side annotation DB, there is no difference in a way of holding data (for example, a structure of XML), as shown in FIGS. 6 and 7; however, regarding a table of DB, in a table of server-side annotation DB shown in FIG. 7 compared with a table of the client-side annotation DB shown in FIG. 6, a <window> table exists under a <user> table, for example, and namely the table of the server-side annotation DB holds data so as to include the table of the client-side annotation DB.

As shown in FIG. 1, the client terminal 1 is constituted of a well-known computer device and provided with a monitor on which an operation screen 10 is displayed, a business screen state acquisition section 21, an annotation display section 22, an active window screen attribute value acquisition section 23, an annotation display position edition section 24, an annotation DB edition section 25, a client-side annotation DB (hereinafter referred to as an annotation DB) 26, and an operation section 27.

An annotation method according to this embodiment is an annotation method in which the client terminal 1 displays an annotation text associated with operation on an operation screen and includes a data accumulation procedure, a monitor procedure, and a display procedure. The monitor procedure is executed after the data accumulation procedure. The display procedure is executed during the execution of the monitor procedure.

In the data accumulation procedure, a plurality of annotation rules created for each window in which an annotation text is to be displayed are accumulated in annotation DBs 26 and 31.

In the monitor procedure, which of windows displayed on the operation screen 10 is an active window is always monitored. In the monitor procedure, SB6 shown in FIG. 9 to be described later is executed.

In the display procedure, when through searching of the annotation DB 26 the annotation rule corresponding to the active window exists in the annotation DB 26, and when annotation display operation is performed by a user, the annotation rule associated with the user's operation is obtained from the annotation DB 26, and an annotation text included in the annotation rule is displayed on the operation screen. In the display procedure, SB5 shown in FIG. 9 to be described later is executed. In this procedure, when no annotation rule exists in the annotation DB 26, the annotation DB 31 may be searched.

The data accumulation procedure may have any one of an attribute value obtaining procedure, a display position editing procedure, and a database editing procedure.

In the attribute value obtaining procedure, when a window in which an annotation is to be given is designated, an attribute value of the window screen is registered as the annotation rule in the annotation DB 26.

In the display position editing procedure, based on user's operation, a position where an annotation text is displayed and a search region of the template image are designated with reference to a predetermined collation position, and a template image is designated from an annotation base image as a capture image of the entire active window.

In the database editing procedure, based on user's operation, a template image of an active window as the annotation rule accumulated in the annotation database DB 26 is edited, and the attribute value of the active window screen is edited.

In those cases, a tool display procedure is executed in the display procedure. In the tool display procedure, SB2 shown in FIG. 9 to be described later is executed.

In the display procedure, user's operation is always monitored in a polling format, whereby a window size and a window coordinate position are obtained, a difference between the window coordinate position and the coordinate position where an annotation is to be displayed is calculated, and an annotation text may be redrawn based on the calculation result.

Figure 2:
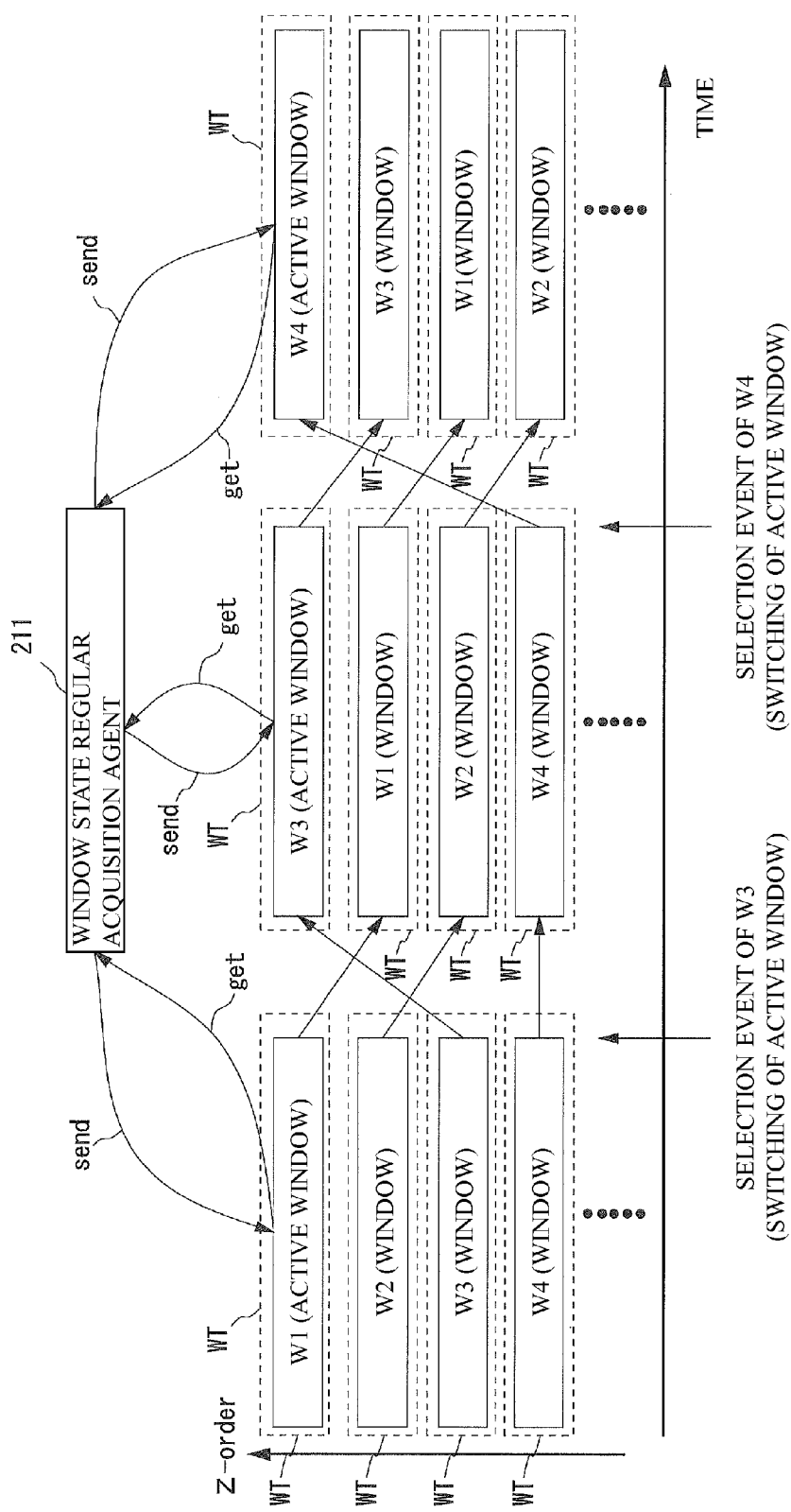
FIG. 2 is a view for explaining operation of a business screen state acquisition section in the embodiment of the disclosure.

In the business screen state acquisition section 21, as shown in FIG. 2, a window state regular acquisition agent 211 obtains (sends, gets) a state in a polling format and performs monitoring in such a state that a window handle of an active window is always obtained, and an executable file name of a window, a size of the window, a coordinate position of the window, and so on are obtained from a window table WT of the active window every time when there is a change in the timing at which the active window is switched. In FIG. 2, the horizontal axis represents time, and the vertical axis represents Z-order. The window table WT is provided for each window and is a table of window control holding a window title that can be obtained from the window handle of the active window, a coordinate position of a window, an executable file name of a window, and so on. The window state regular acquisition agent 211 always operates with respect to the active window.

Windows of applications in the OS(Operation System) of Windows (registered trademark) are displayed on the operation screen 10 so as to be piled up in an order called Z-order, and the active window is a window displayed in the front row in the Z-order. A change occurring when the window displayed in the front row is switched by user's click event operation, a switching event to another window (Alt+tab), and so on is captured, and the change of the active window is notified to the annotation display section 22 and the client-side annotation DB 26.

When the active window is changed by user's operation, the business screen state acquisition section 21 performs text-matching search in which the presence/absence of a title name of the active window always obtained by the window state regular acquisition agent is checked from window title names in the annotation rule stored in the annotation DB 26. As a result of the search, when there is a corresponding window title in the annotation DB 26, the business screen state acquisition section 21 transmits a query for displaying a corresponding DB to the annotation display section 22, and when the size of a window or the coordinate position of the window is changed, the business screen state acquisition section 21 transmits, to the annotation display section 22, a query for moving a display position of an annotation icon and a message tooltip 113 in accordance with the change. When the active window is changed, the business screen state acquisition section transmits, to the client-side annotation DB 26, a query for asking, among the window titles of the changed active window, the presence/absence of the window title included in the annotation DB 26. When the window state regular acquisition agent 211 transmits a query for the timing of switching the active window to the annotation display section 22, the annotation display section 22 always updates a display of an annotation icon group on the operation screen 10.

Figure 3:
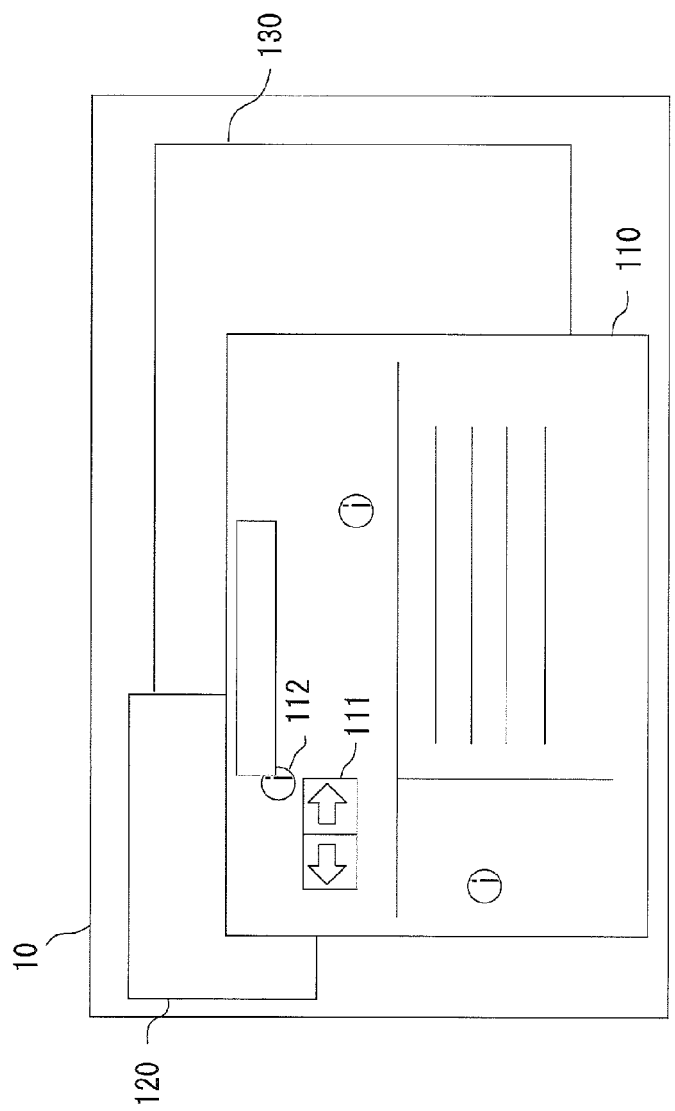
FIG. 3 is a view for explaining a display form of an annotation icon in the embodiment of the disclosure.

The annotation display section 22 obtains a table of annotations accumulated in the client-side annotation DB 26 and, as shown in FIG. 3, overlay-displays an annotation icon 112, representing that there is an annotation based on the position of a widget 111 on the active window 110, on the active window 110. Further, in the annotation display section 22, as the business screen state acquisition section 21 notifies, when the size of a window or the coordinate position of the window is changed, an annotation is redisplayed while shifting by a difference value of a relative coordinate position, whereby an annotation display position can be tracked in real time. Namely, when a user actually refers to an annotation, as shown in FIG. 4, the user discovers the annotation icon 112 and then hovers a mouse cursor 115 over the annotation icon 112 or clicks the annotation icon 112 using a mouse, whereby the message tooltip 113 can be displayed, and an annotation text which is contents of an annotation is described in the message tooltip 113, so that the user can refer to the annotation text.

The active window screen attribute value acquisition section 23 obtains an attribute value of a window to which an annotation is to be given and initially registers the attribute value as an annotation rule in the annotation DB 26. At this time, in the acquisition of the active window screen attribute value of the operation screen 10, the attribute value is different from one automatically monitored by the business screen state acquisition section 21, and a window table acquisition function of the business screen state acquisition section 21 is utilized in the wake of user's operation. The active window screen attribute value acquisition section 23 registers in the annotation DB 26 a window title name of a window screen corresponding to the active window 110, an executable file name of a window, attribute values of a window size and so on, and a capture image (annotation base image) of the entire active window which is a base image of the annotation display position edition section 24.

The annotation display position edition section 24 is a function section which edits the table of the annotation in the annotation rule registered in the client-side annotation DB 26 from the active window screen attribute value acquisition section 23. In the annotation display position edition section 24, based on user's operation, as shown in FIG. 5, a user operating the client terminal 1 designates, as a template image 315, an arbitrary image selected on an annotation base image 300 which is an image of a capture image of the entire screen of the active window previously obtained by the active window screen attribute value acquisition section 23, whereby the user selects the template image.

Further, in the annotation display position edition section 24, the annotation rule in which an item of annotation display setting in the annotation rule accumulated in the client-side annotation DB 26 is set is utilized, as shown in FIG. 5, a user operating the client terminal 1 uses an image of a display position of an annotation as a template image 315, and the annotation icon 112 is displayed with reference to the position corresponding to the template image. At this time, in order to display the annotation icon 112, the annotation display position edition section 24 uses the image of the capture image of the entirety of the previously obtained active window as the annotation base image 300 and edits a display position of an annotation, using a relative x-coordinate position 312 of an annotation icon and a relative y-coordinate position 313 of the annotation icon with a coordinate position 311 of the active window as a starting point. A collation position 316 represents a coordinate position of a dot of an image having a probability that the maximum similarity not less than the similarity set in template matching in a search region 314 of template matching previously designated by user's operation is recorded. When the annotation icon 112 is displayed, the annotation icon 112 is displayed on the operation screen 10 with reference to the relative y-coordinate 313 and the relative x-coordinate 312 of an arbitrary annotation icon previously set from the collation position 316 by a user. The user designates the display position of an annotation text, the template image 315, and the search region 314 of the template image through the annotation display position edition section 24.

As described above, the search region 314 of template matching is previously limited in the active window, whereby efficient matching of the template image 315 with a calculation amount for searching suppressed is achieved.

The annotation DB edition section 25 uses the annotation rule accumulated in the client-side annotation DB 26 and, as shown in FIG. 1, provides a GUI (Graphical User Interface) that can always be edited to a user. The user can confirm contents of an annotation text in the message tooltip 113 displayed as needed, using a window 140 of the annotation DB edition section and, at the same time, can additionally-write and edit the annotation text. In the annotation DB edition section window 140, an annotation DB structure display box 150 and an annotation text edition text box 160 are displayed. Further, in the annotation DB structure display box 150, a target application folder 152 is displayed for each window title 151, and an annotation text 153 is displayed for each of the target application folders 152.

As described above, in the annotation DB structure display box 150, a table of a DB in which a window title registered in the client-side annotation DB 26 is a main key is visualized. By virtue of the provision of the GUI which links the annotation text edition text box to the annotation DB structure display box 150 and edits an annotation text in each case, an inner structure of the client-side annotation DB 26 can be displayed to a user in an intelligible manner.

As described above, the annotation DB edition section 25 has the GUI that allows a user to freely edit the annotation display position, the search region, and so on in cooperation with the annotation display position edition section 24, and the annotation DB edition section 25 immediately receives a feedback from the annotation DB 26 and thereby allows additionally writing and editing of an annotation text through interaction with a user. The annotation DB edition section 25 edits the display position of the annotation text accumulated as a portion of the annotation rule in the annotation DB 26, the template image 315, the search region 314 of the template image, and the attribute value of the active window screen based on user's operation.

Further, in the annotation DB edition section, in order to register an application to which a user wants to give an annotation, a GUI for registration to the client-side annotation DB is provided to the active window screen attribute value acquisition section. For example, a GUI (not shown) such as a pull down menu by right button click of a mouse is provided. An annotation table including a window title registered by the active window screen attribute value acquisition section 23 is updated on the GUI as needed and visualized in the annotation DB structure display box 150 in the annotation DB edition section window 140.

The client-side annotation DB 26 has a rewritable nonvolatile recording section for accumulating the annotation rule, receives a query for changing DB from the annotation display section 22 and the annotation DB edition section 25, a query for changing DB from the annotation display position edition section 24, and a query for initially registering DB from the active window screen attribute value acquisition section 23, receives, among the tables in the server-side annotation DB 31, a condition table based on an operation policy required for the client terminal of a user, and thereby receives a transaction for selecting the server-side annotation DB 31 useful for the user.

As shown in FIG. 6, in an example of a file structure in the client-side annotation DB 26, a table of the annotation DB 26 is expressed with an XML structure, and as the form of the DB, a transaction changing and adding annotation information for each query for change is run. Data held by the annotation DB 26 include a name of an executable file obtained from the business screen state acquisition section 21 through the active window screen attribute value acquisition section 23, a process ID, a window title, and so on, and when the data is registered in the client-side annotation DB 26, changes are applied to a window title, whereby when the annotation DB 26 is referred to, a corresponding attribute value can be referred to from a table including the window title.

The operation section 27 has well-known keyboard, mouse, and so on, and when a user operates the keyboard or the mouse, character input and position input can be performed.

The server 3 is constituted of a well-known computer device and provided with the server-side annotation DB 31.

The server-side annotation DB 31 has a rewritable nonvolatile recording section for accumulating the annotation rule as with the client-side annotation DB 26, is connected to the client-side annotation DB 26 as shown in FIG. 1, and is constituted of a data structure, which is changed in synchronism with data of the server-side annotation DB 31 in such a form that when a change is applied to the client-side annotation DB 26, the change contents are synchronized from the client-side annotation DB 26 to the server-side annotation DB 31 for each Diff thereof, for example, a data structure including XML shown in FIG. 7.

Since the server-side annotation DB 31 is provided on the server 3 side as shown in FIG. 1, in a computer system operated in a thin client environment an annotation customized for each of the client terminals 1 or each user can be provided.

A table specific to each user can be held as shown in FIG. 7 by introduction of the server-side annotation DB 31. When an annotation tool is simply introduced into the client terminal 1, it is difficult to share the contents of the annotation rule in situations where the use environment is different depending on the individual client terminals 1 and a user using the client terminal 1 is different. Thus, by virtue of the provision of the server 3 provided with the server-side annotation DB 31, there is a merit that tables (a user's use environment such as OS, kinds of system handled at the client terminal 1) in the annotation DB specific to the client-side annotation DB 26 and so on can be summarized.

The thin client environment is introduced into the server 3, whereby only a screen image is introduced into the client terminal 1, and operation control can be performed. In this case, it is considered to introduce the environment of the client terminal 1 into the server 3.

Next, annotation display and additional edition of the annotation rule in this embodiment will be described in detail.

Figure 8:
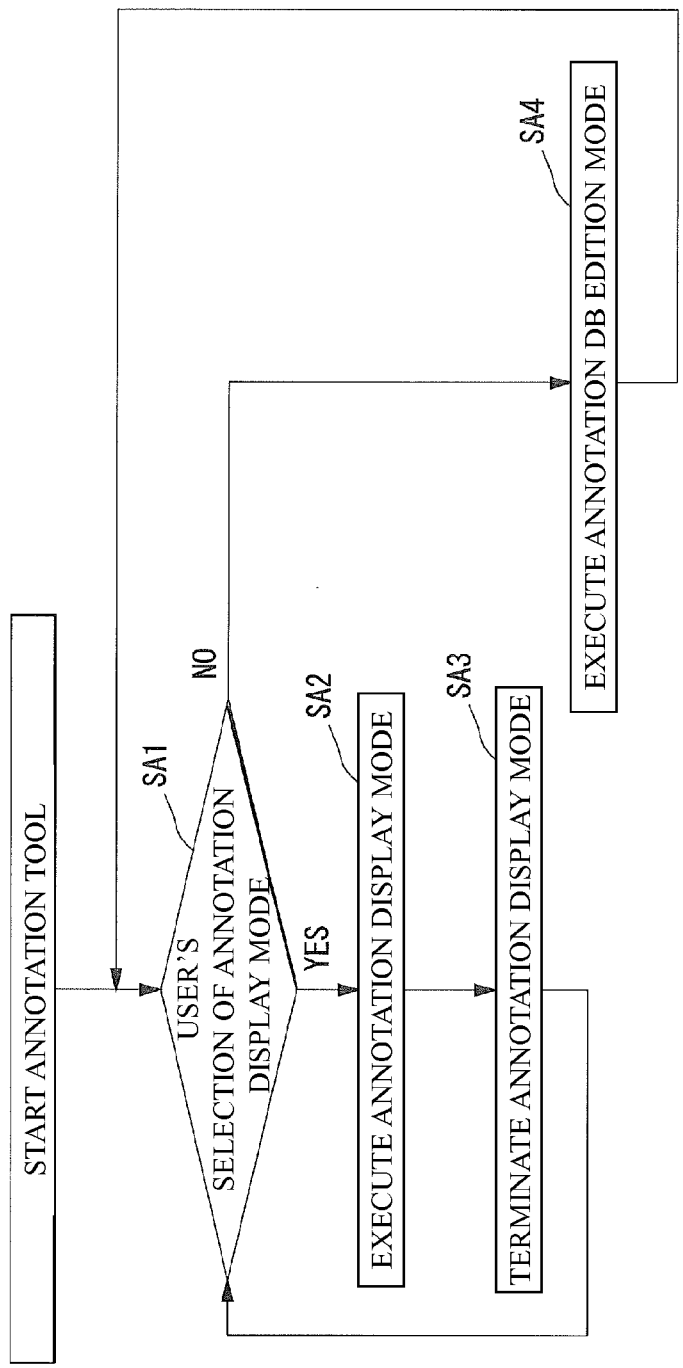
FIG. 8 is a flow chart for explaining activation of an annotation tool in the embodiment of the disclosure.
Figure 9:
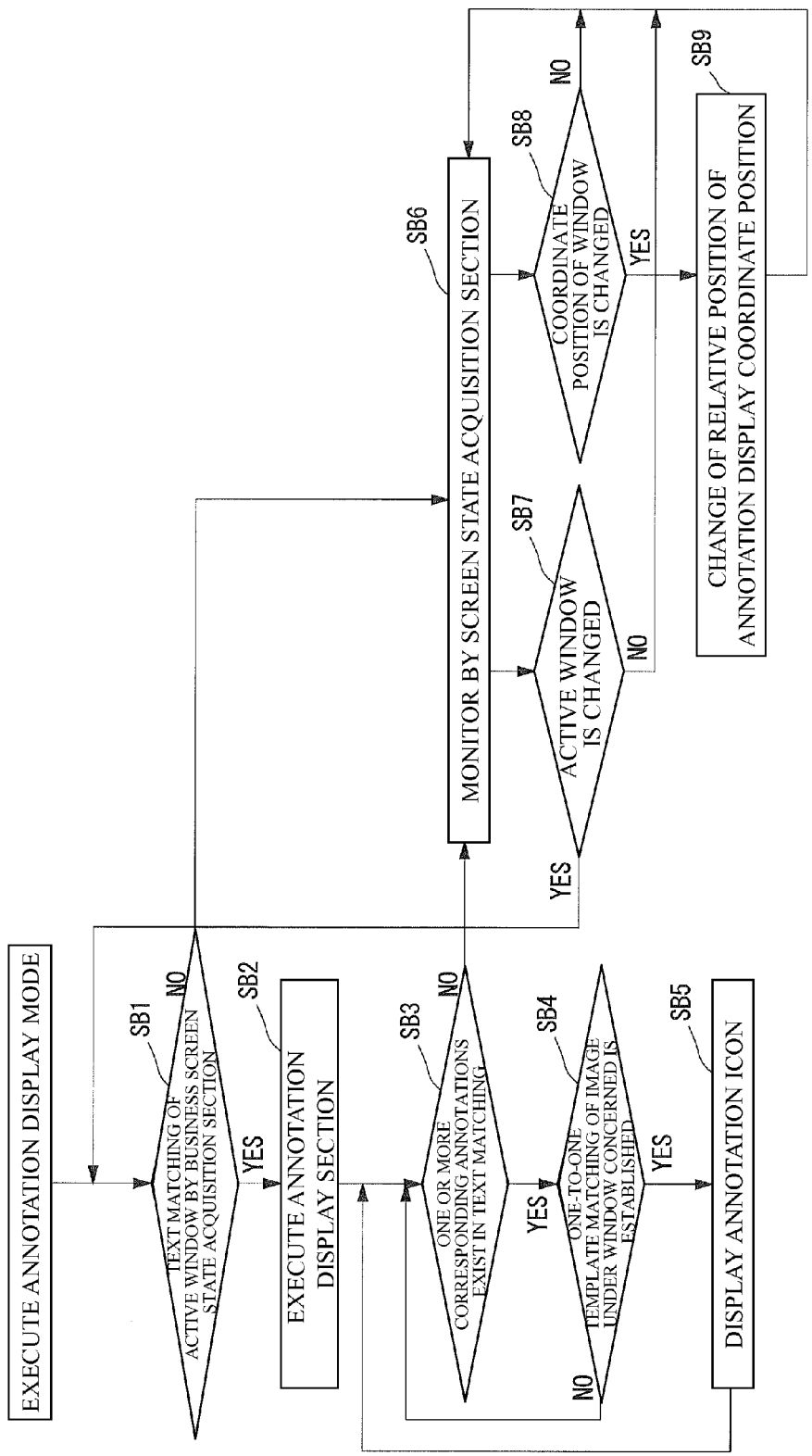
FIG. 9 is a flow chart for explaining an annotation display mode in the embodiment of the disclosure.

FIG. 8 shows a flowchart showing a flow of activation processing of an annotation tool, FIG. 9 shows a flowchart showing a flow of processing executed in an annotation display mode, and FIG. 10 shows a flowchart showing a flow of processing executed in an annotation DB edition mode.

When the annotation tool is activated simultaneously with activation of the client terminal 1, as shown in FIG. 8, whether or not the annotation display mode is selected by a user is monitored (SA1), and when the annotation display mode is selected, the annotation display mode shown in FIG. 9 is executed (SA2). When the annotation display mode is terminated (SA3), the flow is shifted to the processing of SA1.

As a result of monitoring in the SA1, when the annotation display mode is not selected, the annotation DB edition mode shown in FIG. 10 is executed (SA4), and except when the annotation display mode is selected, the annotation DB edition mode is executed.

In the annotation display mode, in the client terminal 1, text matching of the active window is performed by the business screen state acquisition section 21, as shown in FIG. 9 (SB1). Namely, a state in the polling format is obtained (sent, got) by the business screen state acquisition section 21. Text matching is performed by determining whether or not a character string of a title value stored in a window tag of an XML structure stored in the annotation rule accumulated in the client-side annotation DB 26 and the server-side annotation DB 31 is included in a window title name obtained by the window state regular acquisition agent 211, whereby whether the annotation rule of the active window is present in the annotation DBs 26 and 31 is collated.

As a result of the collation, when the annotation rule of the active window is present in the annotation DBs 26 and 31, the client terminal 1 executes the annotation display section 22 (SB2), whereby the annotation display section 22 performs image matching as described above, the annotation icon 112 is displayed on the active window 110, and the message tooltip 113 and the annotation text are displayed corresponding to user's operation.

Subsequently, the client terminal 1 determines whether or not one or more corresponding annotation texts in text matching is present in the annotation DBs 26 and 31 (SB3). As a result of the determination, when one or more, that is, a plurality of annotation texts are registered in the client-side annotation DB 26 and the server-side annotation DB 31 (when there are one or more corresponding annotations in the text matching), whether or not one-to-one template matching of an image in the active window is established is determined (SB4). Namely, image matching is performed with respect to the active window by only the number of the registered annotation texts, and when image matching is completed (when the one-to-one template matching of an image under the active window is established), the annotation icon is displayed (SB5), and after that, the flow is shifted to the processing of SB3. When the one-to-one template matching of an image under the active window is established, the flow is shifted to the processing of SB3. When the above processings of SB3 and SB4 are repeated, one annotation rule is applied to one window, and the annotation icons 112 and the annotation texts can be displayed at a plurality of portions.

When no annotation of the active window exists in the annotation DBs 26 and 31 as a result of the determination in SB1, and when one or more annotation texts are not registered in the client-side annotation DB 26 and the server-side annotation DB 31 as a result of the determination in SB3, monitoring is performed by the business screen state acquisition section 21 (SB6), whether or not the active window is changed is monitored (SB7), and, at the same time, whether or not the coordinate position of the window is changed is monitored (SB8). When the active window is thus always monitored, if the active window is changed, the flow is shifted to the SB2 processing through conditional branching based on the text matching result in SB1, and the annotation display section 22 is executed again. When the coordinate position of the window is changed, a relative position of an annotation display coordinate position is changed (SB9).

Meanwhile, in the execution of the annotation edition mode, the annotation DB edition section 25 has four functions, that is, "creation of a new annotation" (SC1), "edition of an annotation" (SC2), "deletion of an annotation" (SC3), and "edition of an annotation text" (SC4) based on user's operation, and when the execution of the annotation edition mode is started, the client terminal 1 executes these functions in response to the user's operation.

In the "creation of a new annotation" (SC1), the active window screen attribute value is obtained by the active window screen attribute value acquisition section 23 (SC5), and an annotation DB having an XML structure is newly created in the client-side annotation DBs 26. At this time, the process name, title, window class, acquisition time, and so on of a target window are obtained, whereby a DB as a base for edition of the annotation rule is constructed. The annotation DB edition section 25 transmits a query for a new registration of the annotation rule to the client-side annotation DB 26, whereby the above processing is required for the annotation DB 26. Consequently, a new annotation is created in the server-side annotation DB 31.

In "edition of annotation" (SC2), the annotation display position edition section 24 is executed (SC6), relative x-coordinate and relative y-coordinate of an annotation icon, a template image, a search region of template matching, and a similarity threshold of template matching are determined from the annotation base image, and a query for changing a parameter value used as an input value of template matching is transmitted from the annotation DB edition section 25 to the client-side annotation DB 26. Consequently, the client-side annotation DB 26 changes the annotation rule, the content displayed in the annotation DB edition section window 140 is changed in accordance with the change (SC7), and, at the same time, the annotation rule of the server-side annotation DB 31 is changed.

In "deletion of an annotation" (SC3), a query for deleting an annotation text to be deleted is transmitted to the client-side annotation DB 26. Consequently, the client-side annotation DB 26 deletes the designated annotation text, the contents to be displayed in the annotation DB edition section window 140 are changed in accordance with the deletion (SC7), and, at the same time, the corresponding annotation text in the server-side annotation DB 31 is deleted.

In "edition of an annotation text" (SC4), the annotation text input to the annotation text edition text box 160 is updated. At this time, a query for changing an annotation text is transmitted from the annotation DB edition section 25 to the client-side annotation DB 26. Consequently, the client-side annotation DB 26 changes the designated annotation text, the contents to be displayed in the annotation DB edition section window 140 are changed in accordance with the change (SC7), and, at the same time, the corresponding annotation text in the server-side annotation DB 31 is changed.

In the above four functions, when the contents of the client-side annotation DB 26 are changed, the contents to be displayed in the annotation DB edition section window 140 are changed, and while update processing is performed on an actual screen, synchronization processing with the server-side annotation DB 31 is performed periodically. While the change of the contents of the client-side annotation DB 26 is notified from the client-side annotation DB 26 side to the server-side annotation DB 31, the change of the contents of DB based on a change of a policy of the server-side annotation DB 31 is notified from the server-side annotation DB 31 side to the client-side annotation DB 26, whereby periodic update processing for the contents of both the annotation DBs 26 and 31 is performed.

As described above, according to this embodiment, since the annotation texts accumulated in the annotation DBs 26 and 31 are overlay-displayed on the operation screen 10, a user can obtain knowledge through actual business by viewing the annotation texts, and therefore, business can be easily performed. Further, in this embodiment, since a widget displayed on a screen in accordance with transition of the operation screen 10 is recognized with an image while regarding the widget as a feature quantity specific to a screen, various annotation texts can be interactively provided directly to a user. The annotation DB for accumulation of the annotation texts in which business knowledge is materialized with respect to a plurality of users in various states is held, whereby the annotation text can be actively additionally-written and edited.

Further, according to this embodiment, management of the annotation is facilitated by creating the annotation DB managed for each window as an annotation target, and while meaningless template matching processing is reduced by searching and narrowing down an annotation rule with a character string of a window title of an active window, a search region for template matching is limited to one window (that is, the active window), whereby a calculation amount for individual template matching processing can be suppressed. Since the annotation icon, the message tooltip, and the annotation text are displayed to a user only when the active window is displayed, the calculation amount for searching can be reduced, and there is provided a function of moving the display position of an annotation icon in each case in accordance with the changes of the display position of a window and the size of the window; therefore, the processing speed fast enough to avoid inhibition of actual operation can be realized.

According to this embodiment, since the GUI for annotation DB edition capable of easily additionally-writing and editing an annotation text is provided, additional-wiring and change can be performed in real time in an annotation icon or a message tooltip in which the annotation text is displayed. Since a user operates a system to immediately confirm the result associated with the change and can obtain a feedback through an operation screen, the user can perform dialogic annotation creating operation, the annotation text is displayed so as to be overlaid on an operation screen, and there is provided the annotation DB accumulating the annotation rule in which the annotation text is additionally-written and edited in each case; therefore, this annotation rule can be easily shared with other users.

Further, according to this embodiment, when an annotation text is redrawn, the difference between the window coordinate position and the coordinate position where the annotation is to be displayed is calculated, the annotation is redrawn based on the calculation result, and therefore, the calculation amount and time taken for redrawing the annotation text can be reduced compared with the prior art. Since the annotation rule accumulated in the sever-side annotation DB 31 is changed in synchronism with the change of the annotation rule accumulated in the client-side annotation DB 26, the annotation rule can be shared with users using other client terminals.

Obviously, in the client terminal 1, the entire or a portion of processing performed by other than a storage section as hardware of the annotation DB 26 can be realized by hardware or a computer program.

INDUSTRIAL APPLICABILITY

Even though an existing business system operated on a terminal device is not modified, when a business system does not have an API for access from outside, an annotation for explaining the fact can be easily given to automatic operation and a widget on a screen, the annotation rule can be easily additionally-edited, and, at the same time, the calculation amount taken for searching database when an annotation is displayed can be reduced compared with the prior art.

REFERENCE SIGNS LIST

1: Client terminal (terminal device)
10: Operation screen
110: Active window
111: Widget
112: Annotation icon
113: Message tooltip
114: Mouse cursor
120, 130: Window
140: Window of annotation DB edition section
150: Annotation DB structure display box
151: Window title
152: Target application folder
153: Annotation text
160: Annotation text edition text box
211: Window state regular acquisition agent
300: Annotation base image
311: Coordinate position of active window
312: Relative x-coordinate position of annotation icon
313: Relative y-coordinate position of annotation icon
314: Search region of template matching
315: Template image
316: Collation position
21: Business screen state acquisition section
22: Annotation display section
23: Active window screen attribute value acquisition section
24: Annotation display position edition section
25: Annotation DB edition section
26: Client-side annotation DB
27: Operation section
3: Server
31: Server-side annotation DB

What is claimed is:

1. A terminal device comprising:
an annotation database which accumulates annotation rules created for each window in which an annotation is to be displayed and including a template image for determining an annotation display position;
a business screen state acquisition section which monitors which of windows displayed on an operation screen on which a plurality of windows can be displayed is an active window and requests, when through searching of the annotation database an annotation rule corresponding to the active window exists in the annotation database and annotation display operation is performed by the user, an annotation display section to display an annotation; and
the annotation display section which performs image matching of a template image on an image in the active window and, when the image matching is completed, displays annotation registered in the annotation database at a predetermined position near an image corresponding to the template image in the operation screen.

2. An annotation method comprising:
a data accumulating step of accumulating annotation rules created for each window in which an annotation is to be displayed in an annotation database formed in a rewritable storage section and including a template image for determining an annotation display position;
a monitor step of, after the data accumulating step, monitoring which of windows displayed on an operation screen on which a plurality of windows can be displayed is an active window; and
a display step of performing image matching of a template image on an image in the active window and, when the image matching is completed, displays annotation registered in the annotation database at a predetermined position near an image corresponding to the template image in the operation screen, wherein the monitor step and the display step are executed in parallel.

3. A non-transitory computer readable storage media containing executable computer program instructions which when executed cause a terminal device comprising a computer apparatus to execute an annotation method comprising:
a data accumulating step of accumulating annotation rules created for each window in which an annotation is to be displayed in an annotation database formed in a rewritable storage section and including a template image for determining an annotation display position;
a monitor step of, after the data accumulating step, monitoring which of windows displayed on an operation screen on which a plurality of windows can be displayed is an active window; and
a display step of performing image matching of a template image on an image in the active window and, when the image matching is completed, displays annotation registered in the annotation database at a predetermined position near an image corresponding to the template image in the operation screen,
wherein the monitor step and the display step are executed in parallel.

4. The terminal device according to claim 1,
wherein the annotation database includes a character string of a window title, and
wherein the business screen state acquisition section determines whether an annotation rule corresponding to the active window is present by performing text matching of a window title of the active window.

5. The terminal device according to claim 1, further comprising:
an active window screen attribute value acquisition section which registers, when a window to which an annotation is to be given is designated, an attribute value of the window screen and an annotation base image as a capture image of the entire active window as the annotation rule in the annotation database; and
an annotation display position edition section which, based on user's operation, designates an image selected on the annotation base image as the template image and designates a position where annotation is displayed with reference to a position that corresponds to the template image.

6. The terminal device according to claim 4, further comprising:
an active window screen attribute value acquisition section which registers, when a window to which an annotation is to be given is designated, an attribute value of the window screen and an annotation base image as a capture image of the entire active window as the annotation rule in the annotation database; and
an annotation display position edition section which, based on user's operation, designates an image selected on the annotation base image as the template image and designates a position where annotation is displayed with reference to a position that corresponds to the template image.

7. The annotation method according to claim 2,
wherein the annotation database includes a character string of a window title, and
the monitoring step determines whether an annotation rule corresponding to the active window is present by performing text matching of a window title of the active window.

8. The annotation method according to claim 2, further comprising:
an active window screen attribute value acquisition step of registering, when a window to which an annotation is to be given is designated, an attribute value of the window screen and an annotation base image as a capture image of the entire active window as the annotation rule in the annotation database; and
an annotation display position edition step of, based on user's operation, designating an image selected on the annotation base image as the template image and designates a position where annotation is displayed with reference to a position that corresponds to the template image.

9. The annotation method according to claim 7, further comprising:
an active window screen attribute value acquisition step of registering, when a window to which an annotation is to be given is designated, an attribute value of the window screen and an annotation base image as a capture image of the entire active window as the annotation rule in the annotation database; and
an annotation display position edition step of, based on user's operation, designating an image selected on the annotation base image as the template image and designates a position where annotation is displayed with reference to a position that corresponds to the template image.

10. A server device comprising:
an annotation database which accumulates annotation rules created for each window in which an annotation is to be displayed and including a template image for determining an annotation display position,
wherein the server device performs image matching of a template image on an image in an active window and, when the image matching is completed, transmits an annotation registered in the annotation database for displaying the annotation at a predetermined position near an image corresponding to the template image in the operation screen, in response to a request from a business screen state acquisition section which monitors which of windows displayed on an operation screen on which the windows can be displayed is the active window.

11. The server device according to claim 10,
wherein the annotation database includes a character string of a window title, and
wherein the server device determines whether an annotation rule corresponding to the active window is present by performing text matching of a window title of the active window in response to a request from the business screen state acquisition section.

12. The server device according to claim 10, further comprising:
an annotation display section which obtains from the annotation database an annotation rule corresponding to user's operation in response to the request from the business screen state acquisition section and generates a screen image for displaying on the operation screen the annotation included in the annotation rule,
wherein the server device transmits the screen image to a client terminal connected through a network, and causes the operation screen of the client terminal to display the screen image.

13. The server device according to claim 11, further comprising:

an annotation display section which obtains from the annotation database an annotation rule corresponding to user's operation in response to the request from the business screen state acquisition section and generates a screen image for displaying on the operation screen the annotation included in the annotation rule, wherein the server device transmits the screen image to a client terminal connected through a network, and causes the operation screen of the client terminal to display the screen image.

14. An annotation method, comprising:

accumulating, in an annotation database, annotation rules created for each window in which an annotation is to be displayed and including a template image for determining an annotation display position; and image matching of a template image on an image in an active window and, when the image matching is completed, transmitting an annotation registered in the annotation database for displaying the annotation at a predetermined position near an image corresponding to the template image in the operation screen, in response to a request from a business screen state acquisition section which monitors which of windows displayed on an operation screen on which the windows can be displayed is the active window.

15. The annotation method according to claim 14, wherein the annotation database includes a character string of a window title, and wherein the annotation method further comprises determining whether an annotation rule corresponding to the active window is present by performing text matching of a window title of the active window in response to a request from the business screen state acquisition section.

16. The annotation method according to claim 14, further comprising:

obtaining from the annotation database an annotation rule corresponding to user's operation in response to the request from the business screen state acquisition section and generating a screen image for displaying on the operation screen the annotation included in the annotation rule; and transmitting the screen image to a client terminal connected through a network, and causing the operation screen of the client terminal to display the screen image.

17. The annotation method according to claim 15, further comprising:

obtaining from the annotation database an annotation rule corresponding to user's operation in response to the request from the business screen state acquisition section and generating a screen image for displaying on the operation screen the annotation included in the annotation rule; and transmitting the screen image to a client terminal connected through a network, and causing the operation screen of the client terminal to display the screen image.

18. A non-transitory computer readable storage media containing executable computer program instructions which when executed cause a server device comprising a computer apparatus to execute an annotation method comprising:

accumulating, in an annotation database, annotation rules created for each window in which an annotation is to be displayed and including a template image for determining an annotation display position; and image matching of a template image on an image in an active window and, when the image matching is completed, transmitting an annotation registered in the annotation database for displaying the annotation at a predetermined position near an image corresponding to the template image in the operation screen, in response to a request from a business screen state acquisition section which monitors which of windows displayed on an operation screen on which the windows can be displayed is the active window.

* * * * *